United States Patent [19]
Green

[11] Patent Number: 6,138,818
[45] Date of Patent: Oct. 31, 2000

[54] WORKPIECE INVERSION SYSTEM FOR MILLING MACHINES

[75] Inventor: Stephen C. Green, West Fork, Ark.

[73] Assignee: Green Technologies Inc., West Fork, Ark.

[21] Appl. No.: 09/197,795

[22] Filed: Nov. 23, 1998

[51] Int. Cl.[7] ............................ B65G 47/24; B21B 15/00; B23D 7/08

[52] U.S. Cl. ........................ 198/373; 198/409; 198/410; 409/224; 409/227; 29/33 P; 29/563

[58] Field of Search ................................ 198/373, 379, 198/401–404, 406, 407, 408, 414, 409, 410; 409/224, 227; 29/33 P, 563; 414/762, 763, 766, 769, 773

[56] References Cited

U.S. PATENT DOCUMENTS

| | | | |
|---|---|---|---|
| 4,782,567 | 11/1988 | Kanaya et al. | 29/563 X |
| 4,890,716 | 1/1990 | Kitamura | 29/33 P X |
| 5,052,540 | 10/1991 | Matsuyama et al. | 29/33 P X |
| 5,443,412 | 8/1995 | Yoshikawa et al. | 29/33 P X |
| 5,933,933 | 8/1999 | Fritz et al. | 29/33 P |

*Primary Examiner*—Christopher P. Ellis
*Assistant Examiner*—Gene O. Crawford

*Attorney, Agent, or Firm*—Stephen D. Carver

[57] ABSTRACT

A workpiece inversion system for orienting a workpiece in a conventional milling machine or the like. The workpiece is securely attached to a pallet. The pallet is of uniform design to provide a standard interface for presenting the workpiece to the milling machine. The pallets are transported to the milling machine where a combination of parts senses the pallet orientation. Upon arrival to the input station the pallet mates with an inverting receptor adjacent the input station. An actuator rotates the pallet 180 degrees thereby inverting the pallet and the attached workpiece. The inverted pallet is moved onto an inverted linear actuator disposed within the volume above the milling head. The inverting receptor returns to it original position to receive another workpiece. The inverted workpiece is moved through the machining area. As machining occurs, debris dislodged by the force of forced oil lubrication and gravity will fall away from the workpiece. The pallet then passes thorough the machining area and is mated with a reverting receptor. The reverting receptor then rotates the pallet containing the workpiece 180 degrees. The pallet and workpiece are placed back in the same relative position they had when first entering the input station on the other side of the machine.

20 Claims, 7 Drawing Sheets

WORKPIECE INVERSION SYSTEM FOR MILLING MACHINES

BACKGROUND OF THE INVENTION

I. Field of the Invention

The present invention relates generally automatic apparatus for inverting workpieces for subsequent milling. More particularly, the present invention relates to a system for inverting workpieces entering a milling machine, and for reinverting them after machining. Known prior art is classified in U.S. Patent Class 414, Subclasses 762, 763, 766, 769 and 773.

II. Description of the Prior Art

Modern computer controlled milling machines are capable of a variety of machining operations. Typical milling machines comprise a machine head with a rotating spindle shaft that handles a plurality of machine tools, including chip removal tools, rotary tools, milling cutters and the like. Usually a carousel adjacent to the milling head stores the desired tools for computer selection and transfers them to the milling head as manufacturing progresses. As machining progresses, chips and dross are dislodged from the area of chip formation in response to cutting fluid spraying and gravity. Milling debris such as metallic chips and particles collect at the bottom of the usually enclosed machining volume, and are removed through chip extraction systems known in the rt. Obviously as a result of gravity the dislodged chips and debris, which may be spun off in a variety of directions during machining, ultimately move downwardly to the machine bottom. It is a known advantage to have chips drop downwardly, as they may get out of the way of subsequent machining operations. However, depending upon the orientation of the workpiece and the relative position of the milling head, not all chips and debris drop directly downwardly.

If dislodged milling debris does not quickly evacuate the region of the workpiece being machined, its presence can cause a number of problems.

As the chips get in the way of the machine tool, the workpiece may become deformed, cutting tools become dull more quickly, and manufacturing tolerances may not be met. Particularly bad cases can result in tool breakage, and the marring of the workpiece finish. If the chips are removed quickly and efficiently, better manufacturing precision and speed is achieved. Machine tool life can be extended as well.

To maximize the cleansing effect of gravity upon dislodged chips or debris, the point of machining (i.e., where the machine tool cutter engages the workpiece) must be established below the rest of the structure, near the lowest point of the workpiece within the machining volume. The amount of necessary machining near the bottom of the workpiece depends upon a variety of factors, including the type and duration of the required machining operation, the size and configuration of the workpiece, and the type of materials involved. It has been recognized that advantages can be obtained when milling certain workpieces in an inverted orientation. However, it would seem desirable to provide an inverting system that may be retrofitted to existing milling equipment so that all workpieces to be machined may be placed in the most desirable orientation.

Conventional reversing apparatus use vacuum suction cups that grip a workpiece in one horizontal position and then rotate the workpiece 180 degrees. According to this reversal system, the vacuum suction cups must be lifted high and retracted to be outside the area of rotation. An example of this design can be found in U.S. Pat. No. 4,498,840. One problem associated with systems of this type is when raising the cups high requires the use of a tall reversing apparatus and a long and complex piping system connected to the suction cups. Another problem is that suction cups may not adequately grip workpieces with irregular surfaces. Yet another problem is the reversal procedure is a prolonged and hence, inefficient operation.

Another design for inverting a workpiece can be found in U.S. Pat. No. 4,715,775. It is proposed here to invert large-scale heavy material such as a metal mold through a combination of gears. This process requires the use of complicated gear mechanisms, clutches and motors. U.S. Pat. No. 2,862,629 discloses an inverting mechanism that utilizes a plurality of worm wheels for inverting large numbers of paper sheets. Another gear driven transfer mechanism is disclosed in U.S. Pat. No. 4,056,198. A reversible drive oscillates in unison a pair of gearboxes through 180 degrees. The gearboxes carry shafts with arms of equal length mounted thereon. Grippers attached to the ends of the arms attach to the lateral edge of the work piece. One problem found in systems of this type is that they cannot be fitted to an existing system. Also, the complex gear and drive systems increase the need for maintenance and thus increase the cost of operation.

Designs for rotating a package 180 degrees have been proposed, an example of which may be found in U.S. Pat. No. 5,141,388. A gripper element is movably mounted to a linear carriage. The gripper element on the basis of a control signal can grip and release a package. Through the use of a slotted guide and a control cam the package is rotated as it moves along a work area. In U.S. Pat. No. 4,573,863 it is proposed to use a set of clamp arms disposed about a conveyor to grip a package. When actuated, die clamp arms are elevated and rotated 180 degrees after which the clamp arms are lowered back to the conveyor in an inverted position. U.S. Pat. No. 4,523,670 and Euro. Pat. No. 0 233 657 discloses method of transferring and orienting a workpiece that utilize clamps and conveyors. One problem with designs of this type they only allow for the simple raising and lowering of a workpiece on a conveyor belt or the like. Another problem is they are not adaptable to existing machines.

SUMMARY OF THE INVENTION

My new workpiece orienting system provides a means of optimally orienting workpieces for machining in conventional milling machines or the like. Ideally the system may be retrofitted to existing milling machines, or it may be included as original equipment during manufacture of the milling machine.

While the desired orientation of workpieces to be milled is "upside down," the workpieces are oriented "right side up" while being uniformly secured to suitable pallets. The pallets provide a standard interface piece for presentation to the computer controlled milling machine. The pallets are conveyed to a machine input position, wherein a combination of mechanical parts on the milling machine senses the pallet orientation, and three dimensional computer referencing for the machine progresses. Each workpiece will be similarly positioned on its pallet for uniformity. Usually pallets are dedicated for particular machine parts and workpieces. In the best mode the pallets (and the workpieces borne thereby), are delivered to the input station through a rolling conveyor or the like.

Upon arrival to the input station a sensory switch indicates the arrival of a pallet. The pallet mates with an inverting receptor adjacent the input station. A preferably pneumatic actuator rotates the receptor one hundred eighty degrees, thus inverting the workpiece and its support pallet. The inverted pallet is handed off to a linear actuator disposed within the machine volume above the milling head. My top-mounted linear actuator replaces the normal linear actuators at the bottom of the machining volume, and moves the workpiece through the machining area depending upon computer instructions. A suitable track and appropriate shrouding are provided for the linear actuator.

At this stage milling begins. The computer controlled manufacturing process begins, and the milling head shapes and processes the work-piece. Computer instructions to the linear actuator and the milling head progress in the normal fashion without extreme design modifications or substantial software modifications. As machining occurs, debris including dross and chips are dislodged by the combination of forced cutting fluid flow and gravity. As the workpieces have all been inverted, the exit of unwanted debris will be optimized, as it is implicit that most machine operations will take place near the lowermost point of the workpiece. When dislodged debris falls, the chances of lodging within workpiece orifices or crevices etc. will thus be minimized.

When milling is complete, the linear actuator extends to an exit station. Contemporaneously, of course, the milling head may move to an out-of-the way position, and it may exchange machine tools with the tool carousel, etc. Once at the exit station, the linear actuator releases the pallet to an adjacent reverting receptor position on the opposite side of the milling machine. The reverting receptor grasps the pallet, and rotates one hundred and eighty degrees to return the finished workpiece (and its supporting pallet) to its original orientation. In other words, the finished workpiece is now disposed in the same relative position it had when first entering the input station on the other side of the machine. After the reverting receptor completes its half circle rotation and hands off the workpiece to the exit station conveyor, it rotates back into its former receptive position. Concurrently, the emptied linear actuator crosses over the machining volume and positions itself for another hand-off from the inverting receptor.

Thus a basic object is to provide a system for optimally orienting workpieces in milling machines and other computer controlled manufacturing tools.

Another fundamental object is maximizing the flow of dislodged chips and dross away from the machining operation.

Another object is to improve product tolerances.

A related object is to maximize manufacturing precision.

Another important object is to extend tool life and minimize tool breakage.

Another important object is to minimize part deformation.

Another basic object is to reduce the quantity of rejected parts.

A further object is to provide a system of the character described that inverts parts and workpieces to optimally orient them for precision manufacturing.

Another object is to provide a linear path for workpiece transfer through the machine tool A related object is to provide an improved workpiece finish.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
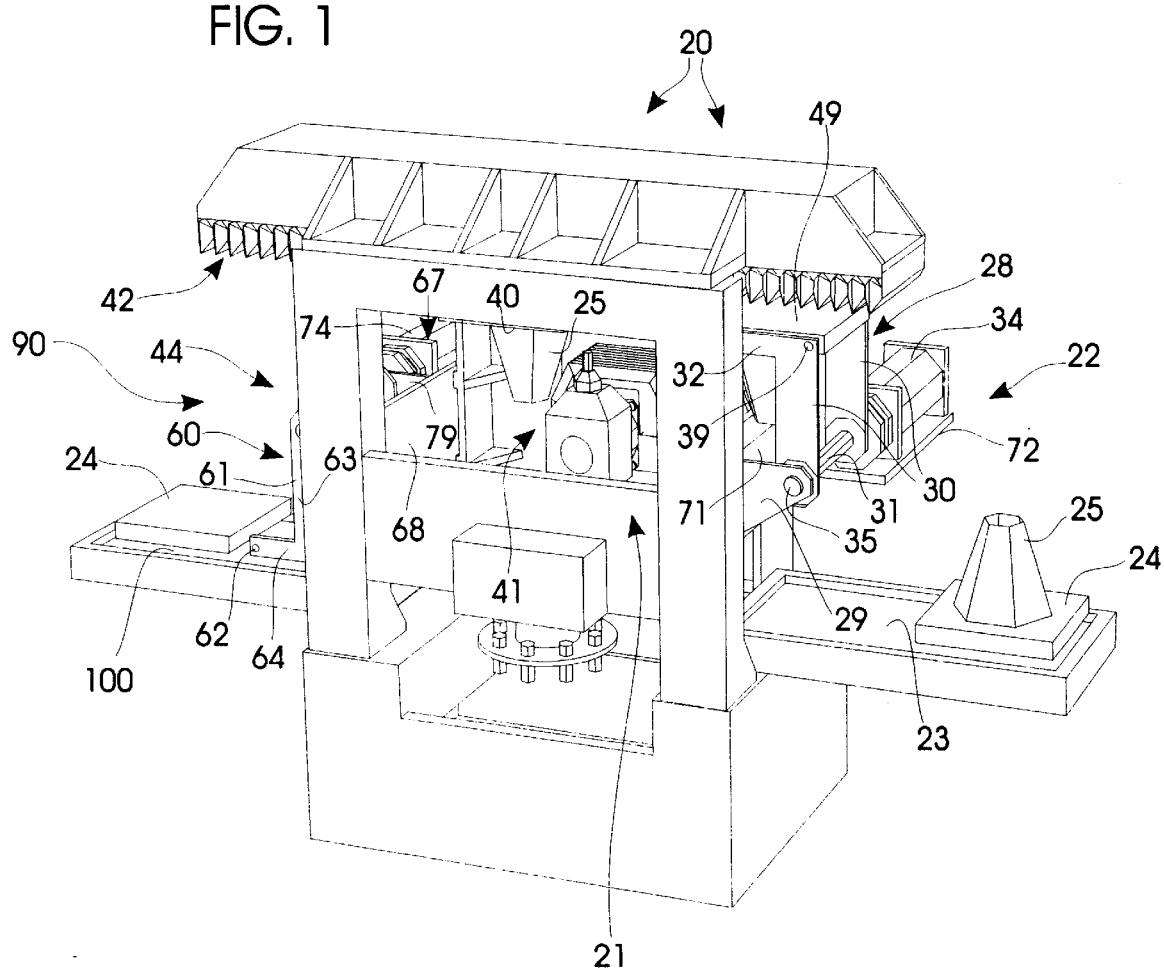
FIG. 1 is a frontal isometric view of my Workpiece Inversion System for Milling Machines.
Figure 5:
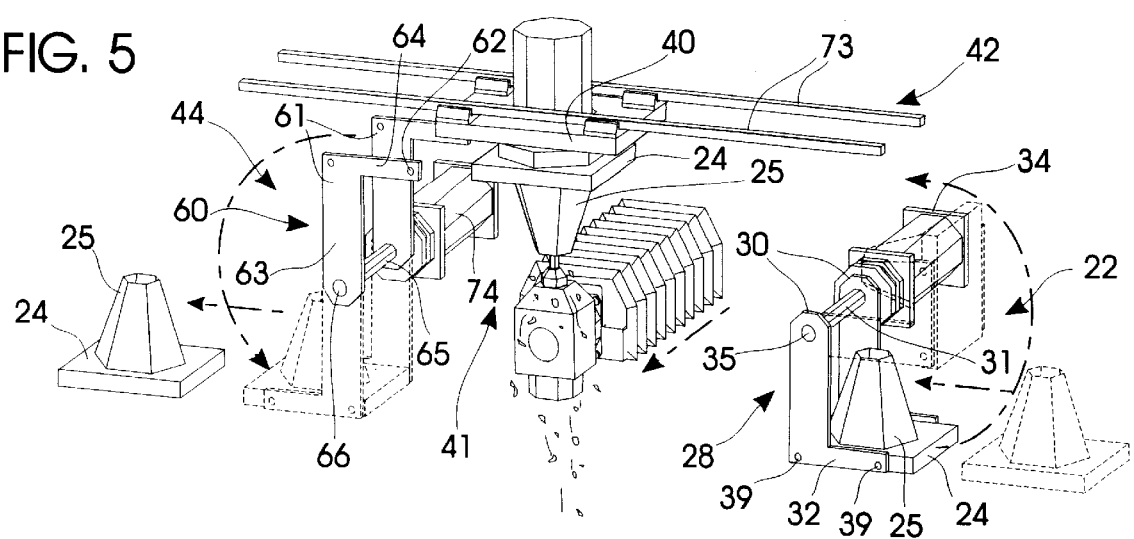
FIG. 5 is a fragmentary, diagrammatic view of my system employed in conjunction with a typical milling machine forming part of a typical production line, showing the relative position of parts while a work-piece is being milled, with moving parts or workpieces shown in dashed lines.

Turning now to the drawings, my workpiece inversion system for milling machines 20 (FIGS. 1, 2 and 3) comprises an input station 22 adjacent machine 21. An inverting receptor 28 is located at input station 22 that receives a workpiece 25 and a supporting pallet 24. An inverting actuator 34 rotates the inverting receptor 28 to deliver the workpiece 25 and pallet 24 to a top mounted linear actuator 40 (FIG. 5). The linear actuator 40 moves the workpiece 25 and pallet 24 through the milling area 41 (FIG. 1) along track 42 (FIG. 5) to exit station 44 (FIG. 1). A reverting receptor 60 (FIG. 2) receives the workpiece 25 and pallet 24. Reverting actuator 74 rotates the reverting receptor 60 to place the workpiece 25 and pallet 24 on exit conveyor 100 (FIG. 2).

Figure 6:
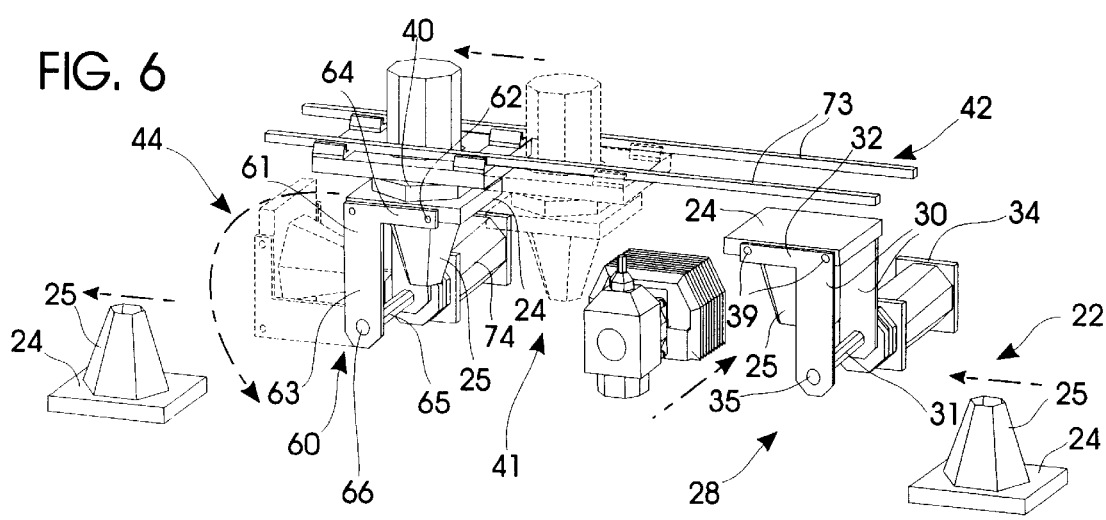
FIG. 6 is a view similar to FIG. 5, but showing a completed workpiece being transported within the milling machine and the entrance of a successive workpiece to the milling position; and, FIG. 7 is a view similar to FIGS. 5 and 6, but showing a completed workpiece in a position to be discharged.
Figure 7:
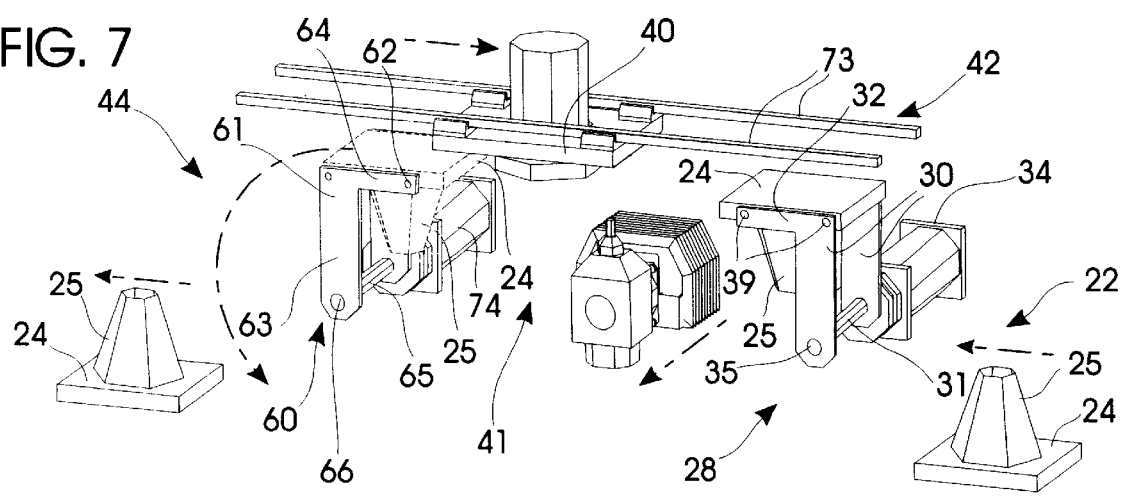

Input station 22 (FIGS. 1,2) comprises an input conveyor 23 and sensory switch (not shown). An inverting receptor 28 is disposed adjacent machine 21 (FIG. 1). Inverting receptor 28 comprises a pair of similar input legs 30 (FIG. 2) spaced apart at the center of rotation point 35 by axle 31 (FIGS. 5, 6, 7). The portion 32 (FIG. 2) of legs 30 contain pallet locking pins 39. Inverting receptor 28 is rotatably contained at axle 31 by bracket 29.

Figure 2:
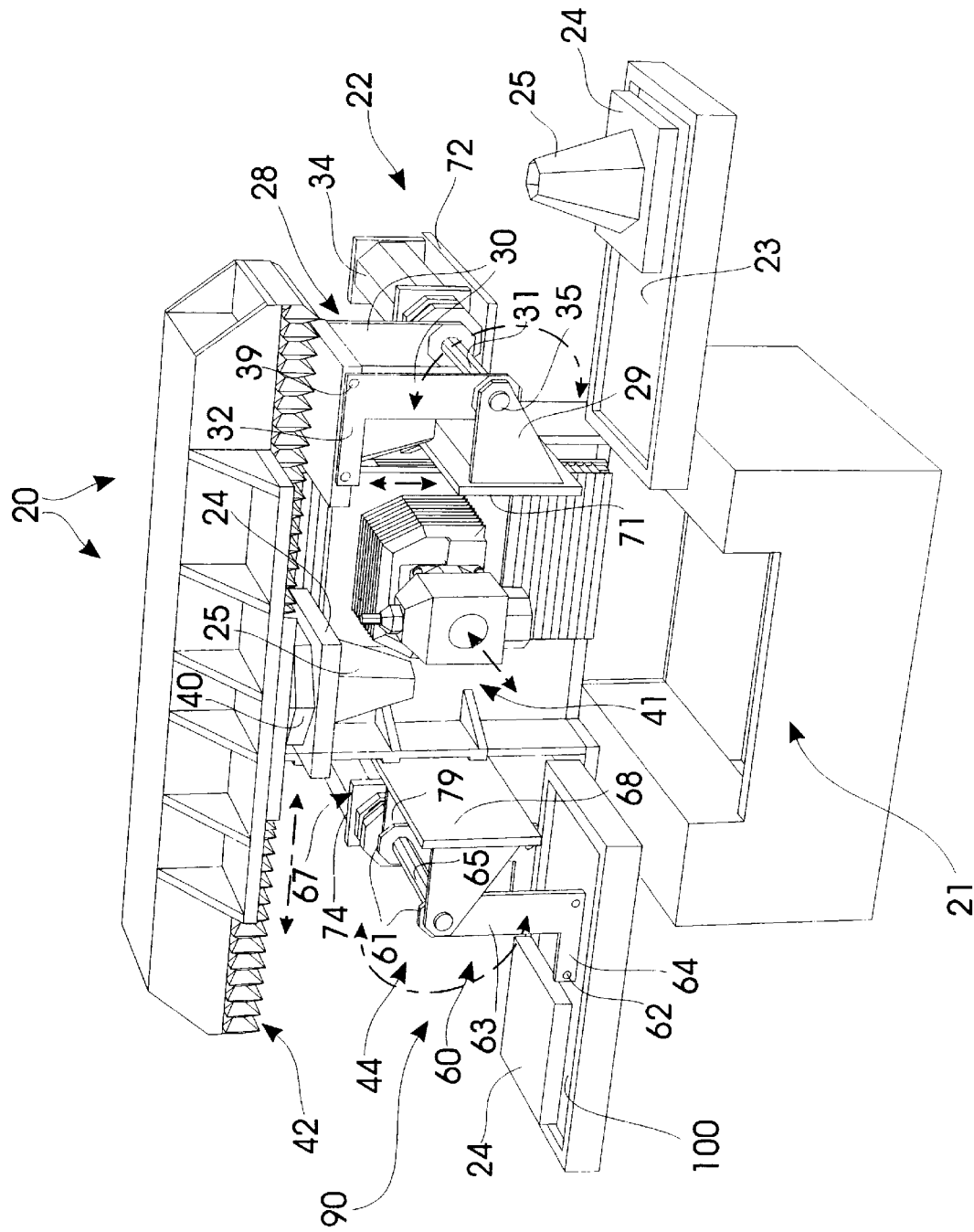
FIG. 2 is a frontal isometric view similar to FIG. 1, but having portions thereof broken away for clarity.

Bracket 29 is secured to machine 21 by mounting plate 71 (FIG. 2). Spaced apart and 70 extend from plate 71 and rotatably capture axle 31 (FIG. 2). An inverting actuator 34 powers drive 38 (FIG. 1, 2) to rotatably control axle 31. Base 72 (FIG. 2) is mounted to machine 21 and secures actuator 34.

A top mounted linear actuator 40 (FIGS. 5,6,7) is disposed within machine 21 and is adapted to mate with an inverted pallet 24. Linear actuator 40 longitudinally traverses the milling area 41 (FIGS. 1, 2) on track 42 (FIG. 2). Track 42 comprises two similar spaced apart rods 73 that slidably capture linear actuator 40. Exit station 44 (FIG. 1) is disposed at discharge end of track 42 and prepares the inverted pallet 24 carrying workpiece 25 to mate with the reverting receptor 60 (FIG. 2 ).

Reverting receptor 60 (FIG. 2) comprises two similar spaced apart exit legs 61. Legs 61 comprise vertical shaft 63 and horizontal base 64 spaced apart by axle 65 at the center of rotation point 66. The horizontal base 64 of leg 61 contains opposing pairs of pallet securing pins 62 (FIG. 2). Reverting receptor 60 is rotatably contained at axle 65 by reverting bracket 67. Bracket 67 (FIG. 2) is secured to machine 21 by mounting plate 68. Spaced apart arms 79 (FIG. 2) extend from plate 68 and rotatably captures axle 65. A reverting actuator 74 (FIG. 2) rotatably controls axle 65. Base 72 (FIG. 2) is mounted to machine 21 and secures reverting actuator 74.

Discharge station 90 (FIG. 1) comprises releasing machinery (not shown) for releasing pallet 24 from pallet securing pins 62 and an exit conveyor 92.

OPERATION

A workpiece 25 is secured to a standardized pallet 24 by appropriate securing hardware and placed on an input conveyor (FIG. 1). The workpiece 25 and pallet 24 is then transported to an input station 22 where three dimensional positioning sensors (not shown) orient the workpiece 25 and pallet 24 for milling. The pallet 24 is adapted to be received on to an inverting receptor 28 and lock with pins 39 (FIG. 2) along portion 32 of receptor 28.

Figure 3:
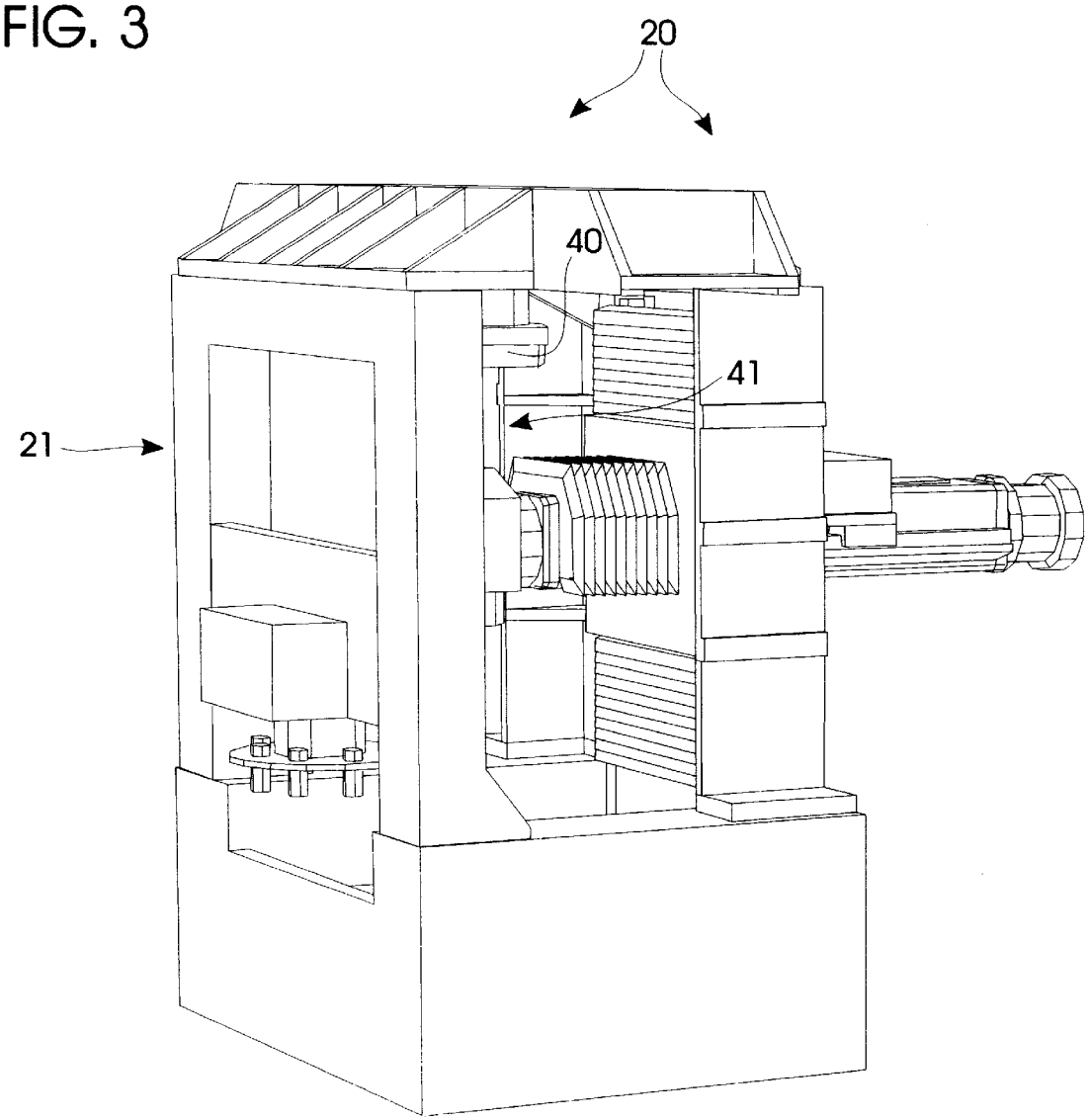
FIG. 3 is an isometric view of an alternative milling machine with which my system may be used.
Figure 4:
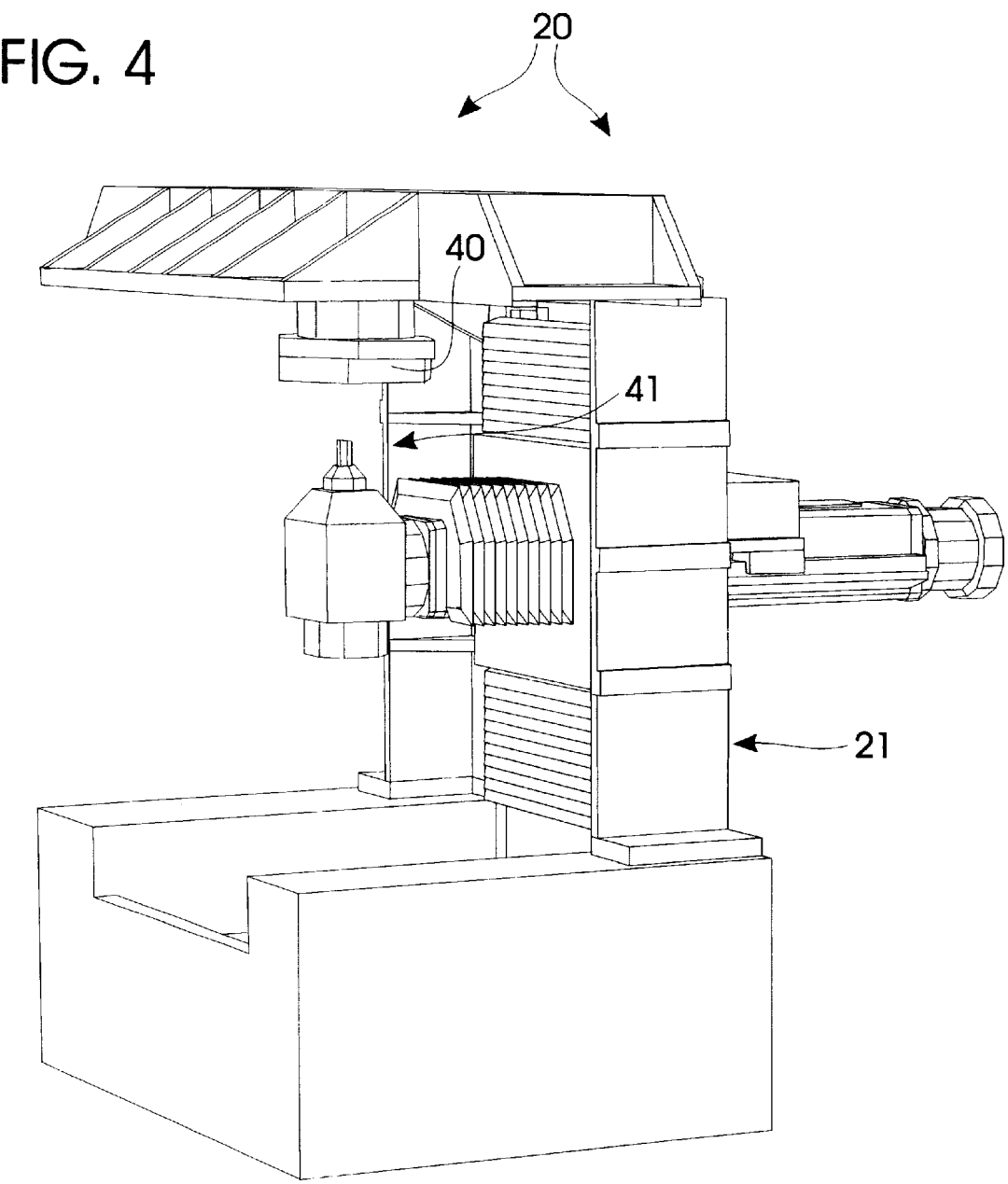
FIG. 4 is an isometric view of the milling machine of FIG. 3, with portions thereof broken away for clarity.

When pallet 24 is secured to receptor 28 securing sensors (not shown) activate the inverting actuator 34. Inverting actuator 34 rotates the inverting receptor 28 180 degrees thereby inverting the pallet 24 and workpiece 25 (FIG. 2). Thus, receptor 28 delivers pallet 24 and work-piece 25 in an inverted orientation to an entrance station 49 (FIG. 1). Pallet 24 and workpiece 25 are then transferred to a top mounted linear actuator 40 (FIG. 3). Linear actuator 40 is adapted to mate with the inverted pallet 24. Pallet 24 is moved off receptor 28. Appropriate transfer sensors (not shown) signal the inverting actuator 34 to reverse rotation and return the now empty receptor 28 to its original orientation within the input station 22. Receptor 28 is now in position to receive another pallet 24.

Linear actuator 40 with inverted pallet 24 and workpiece 25 is moved through milling area 41 by standard milling transport systems (not shown) along track 42 and arrives at milling head 49 (FIG. 1). Standard milling operations are conducted on the inverted workpiece 25 with the resultant chips and dross (not shown) falling away from the workpiece 25 due to gravity. Upon completion of the milling process, linear actuator 40 moves the inverted pallet 24 and the workpiece along track 42 to an exit station 44 (FIG. 1). A transfer mechanism (not shown) transfers the inverted pallet 24 and workpiece 25 to a reverting receptor 60 (FIGS. 5–7). Appropriate sensors (not shown) signal the completion of the transfer. The empty linear actuator 40 travels through the milling area 41 to entrance station 49 to mate with another pallet 24 and workpiece 25.

Transfer sensors (not shown) in the exit station 44 signal the completed transfer of the pallet 24 and workpiece 25 to reverting receptor 60. Reverting actuator 74 (FIG. 2) then rotates reverting receptor 60 180 degrees thereby placing pallet 24 and workpiece 25 in their original orientation in discharge station 90. Release mechanisms (not shown) disengage pallet 24 from reverting receptor 60. Reverting actuator 74 then rotates reverting receptor 60 180 degrees back to the exit station for receiving another pallet 24.

The pallet 24 and workpiece 25 are transported away from the machine 21 along exit conveyor 100 (FIG. 1).

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A workpiece positioning system for milling machines for optimally orienting workpieces for machining, said system comprising:

an input station adjacent said machine;

a plurality of pallets for transporting prealigned workpieces to said input station;

means for indicating the arrival of a pallet at said input station;

an inverting receptor at the input station for serially receiving pallets and the workpieces transported thereby;

first actuator means for rotating the inverting receptor approximately one hundred eighty degrees to invert the workpiece and its support pallet;

a top mounted linear actuator disposed within the milling machine for receiving an inverted pallet from said inverting receptor and moving the inverted workpiece through, the milling machine where it is exposed to a milling head for machining;

a track for controlling the linear actuator;

an exit station;

a reverting receptor disposed at said exit station for receiving pallets and the machined workpieces borne thereby from said linear actuator;

second actuator means for rotating the reverting receptor approximately one hundred eighty degrees to reorient the machined workpiece and its support pallet in a non-inverted position; and, means for discharging the machined workpiece and its pallet from the reverting receptor.

2. The system defined in claim 1 wherein said first actuator means comprises:

a pneumatic actuator for rotating said inverting receptor 180 degrees;

means for determining rotation completion; and means for retracting said pneumatic actuator to return said inverting receptor to its original position.

3. The system defined in claim 1 wherein said linear actuator comprises;

an insert adapted to mate with said inverted pallet;

means for slidably mounting said insert to said milling machine;

means for receiving said inverted pallet from said inverting receptor; and, means for moving said linear actuator through said milling machine.

4. The system defined in claim 1 wherein said means for slidably mounting said insert to said milling machine comprises a plurality of spaced apart, parallel tracks.

5. The system defined in claim 1 wherein said exit station comprises:

means for releasing said inverted pallet from said linear actuator; and means for signaling said linear actuator to return to said input station.

6. The system defined in claim 1 wherein said input station comprises:
   means responsive to said means for indicating the arrival of a pallet at said input station for actuating said first actuator means; and,
   means responsive to linear actuator means for actuating said second actuator means.

7. The system defined in claim 2 wherein said means for actuating said first actuator means comprises a sensory switch for indicating correct placement of said pallet in said input station.

8. The system defined in claim 1 wherein said inverting receptor comprises a pair of spaced apart L-shaped legs comprising upper ends connected by an axle and mounted for rotation, and lower, spaced apart legs for receiving and discharging pallets.

9. The system defined in claim 8 wherein said inverting receptor comprises a plurality of attachment devices disposed on opposite sides of the lower ends of said legs for slidably capturing said workpiece.

10. The system defined in claim 1 wherein said reverting receptor comprises:
    a pair of spaced apart inverted L-shaped legs;
    means for said reverting receptor to receive said inverted workpiece; and,
    a bracket mounted to said machine for rotatably coupling said legs.

11. The system defined in claim 10 wherein said receiver means comprise opposing pairs of locking attachment devices for capturing said inverted workpiece.

12. A workpiece positioning system for milling machines for optimally orienting workpieces for machining, said system comprising:
    an input station adjacent said machine for receiving workpieces borne by pallets;
    means for indicating the arrival of a pallet at said input station;
    an inverting receptor at the input station for serially receiving pallets and the work-pieces transported thereby;
    first actuator means for rotating the inverting receptor approximately one hundred eighty degrees to invert the work-piece and its support pallet;
    a top mounted linear actuator disposed within the milling machine for receiving an inverted pallet from said inverting receptor and moving the inverted workpiece through the milling machine where it is exposed to a milling head for machining;
    a track for controlling the linear actuator;
    an exit station;
    a reverting receptor disposed at said exit station for receiving pallets and the machined workpieces borne thereby from said linear actuator; and,
    second actuator means for rotating the reverting receptor approximately one hundred eighty degrees to reorient the machined workpiece and its support pallet in a non-inverted position.

13. The system defined in claim 12 wherein said inverting receptor comprises a pair of spaced apart L-shaped legs comprising upper ends connected by an axle and mounted for rotation, and lower, spaced apart legs for receiving and discharging pallets.

14. The system defined in claim 13 wherein said inverting receptor comprises a plurality of attachment devices disposed on opposite sides of the lower ends of said legs for slidably capturing said work-piece.

15. The system defined in claim 13 wherein said first actuator means comprises:
    a pneumatic actuator for rotating said inverting receptor 180 degrees;
    means for determining rotation completion; and
    means for retracting said pneumatic actuator to return said inverting receptor to its original position.

16. The system defined in claim 15 wherein said linear actuator comprises;
    an insert adapted to mate with said inverted pallet;
    means for slidably mounting said insert to said milling machine;
    means for receiving said inverted pallet from said inverting receptor; and, means for moving said linear actuator through said milling machine.

17. The system defined in claim 16 wherein said means for slidably mounting said insert to said milling machine comprises a pair of spaced apart, parallel bars.

18. The system defined in claim 16 wherein said exit station comprises:
    means for releasing said inverted pallet from said linear actuator; and
    means for signaling said linear actuator to return to said input station.

19. The system defined in claim 16 wherein said reverting receptor comprises:
    a pair of spaced apart L-shaped legs;
    means for said reverting receptor to receive said inverted workpiece; and,
    a bracket mounted to said machine for rotatably coupling said legs.

20. The system defined in claim 19 wherein said receiver means comprise opposing pairs of locking pins for capturing said inverted workpiece.

* * * * *